US010677678B2

(12) United States Patent
Neunteufl et al.

(10) Patent No.: US 10,677,678 B2
(45) Date of Patent: Jun. 9, 2020

(54) METHOD FOR DETECTING AN UNSEALED LOCATION IN A HEAT RECOVERY SYSTEM OF AN INTERNAL COMBUSTION ENGINE

(71) Applicants: AVL LIST GMBH, Graz (AT); IVECO S.P.A., Turin (IT); FPT INDUSTRIAL S.P.A., Turin (IT)

(72) Inventors: Klemens Neunteufl, Graz (AT); Gerald Gradwohl, Graz (AT); Helmut Altendorfer, Peilstein/Mühl (AT); Fabio Cococcetta, Zürich (CH); Thomas Eckhardt, Romanshorn (CH)

(73) Assignees: AVL List GmbH, Graz (AT); Iveco S.P.A., Turin (IT); FPT Industrial S.P.A., Turin (IT)

( * ) Notice: Subject to any disclaimer, the term of this patent is extended or adjusted under 35 U.S.C. 154(b) by 186 days.

(21) Appl. No.: 15/754,521

(22) PCT Filed: Aug. 19, 2016

(86) PCT No.: PCT/AT2016/050254
§ 371 (c)(1),
(2) Date: Feb. 22, 2018

(87) PCT Pub. No.: WO2017/035547
PCT Pub. Date: Mar. 9, 2017

(65) Prior Publication Data
US 2018/0252609 A1 Sep. 6, 2018

(30) Foreign Application Priority Data

Aug. 28, 2015 (AT) .................................. 50744/2015

(51) Int. Cl.
*G01M 3/02* (2006.01)
*F02D 41/12* (2006.01)
(Continued)

(52) U.S. Cl.
CPC ........... *G01M 3/025* (2013.01); *F02D 41/005* (2013.01); *F02D 41/123* (2013.01);
(Continued)

(58) Field of Classification Search
CPC ....... F02D 41/005; F02D 41/22; G01M 3/025
See application file for complete search history.

(56) References Cited

U.S. PATENT DOCUMENTS

| 6,526,358 B1 | 2/2003 | Mathews et al. |
| 6,568,246 B1 * | 5/2003 | Ponagai ................ G01M 3/025 |
| | | 73/40.5 R |

(Continued)

FOREIGN PATENT DOCUMENTS

JP 2010156314 7/2010

OTHER PUBLICATIONS

IP.Com English Translation of JP 201010156314 (Year: 2010).*
English Abstract of JP 2010156314. 2010.

*Primary Examiner* — John Fitzgerald
(74) *Attorney, Agent, or Firm* — Dykema Gossett PLLC

(57) ABSTRACT

The invention relates to a method for detecting an unsealed location in a heat recovery system (5) of an internal combustion engine (1) of a motor vehicle. The heat recovery system (5) has at least one combustible working medium, a working medium circuit (6) with at least one EGR evaporator (7), a pump (8), and at least one expansion machine (9). The aim of the invention is to allow an early and reliable detection of leakages in the EGR evaporator (7) of a heat recovery system (5) in the simplest manner possible. This is achieved in that the internal combustion engine (1) is operated in the overrun mode, the oxygen concentration in the exhaust gas is ascertained and compared with a defined lower threshold, and if the lower threshold is undershot, a leakage in the EGR evaporator (7) is detected.

10 Claims, 1 Drawing Sheet

(51) Int. Cl.
  *F02D 41/14*   (2006.01)
  *F02D 41/22*   (2006.01)
  *F02D 41/00*   (2006.01)

(52) U.S. Cl.
  CPC ....... *F02D 41/146* (2013.01); *F02D 41/1454* (2013.01); *F02D 41/22* (2013.01); *Y02T 10/47* (2013.01)

(56) References Cited

U.S. PATENT DOCUMENTS

| | | | |
|---|---|---|---|
| 6,752,128 B2 * | 6/2004 | Ozeki | F02D 41/222 123/479 |
| 10,024,159 B2 * | 7/2018 | Glensvig | F01B 25/26 |
| 2003/0230287 A1 * | 12/2003 | Ozeki | F02D 41/222 123/479 |
| 2010/0313565 A1 * | 12/2010 | Kaplan | F01K 23/04 60/670 |
| 2015/0120133 A1 | 4/2015 | Dudar et al. | |
| 2017/0138302 A1 * | 5/2017 | Leon-Rovira | F02G 5/02 |
| 2017/0152766 A1 * | 6/2017 | Andersson | F01K 9/003 |
| 2017/0335783 A1 * | 11/2017 | Cakallik | F01K 23/065 |
| 2018/0156143 A1 * | 6/2018 | Hussain | F01N 5/02 |
| 2019/0242274 A1 * | 8/2019 | Glensvig | F01K 13/003 |

\* cited by examiner

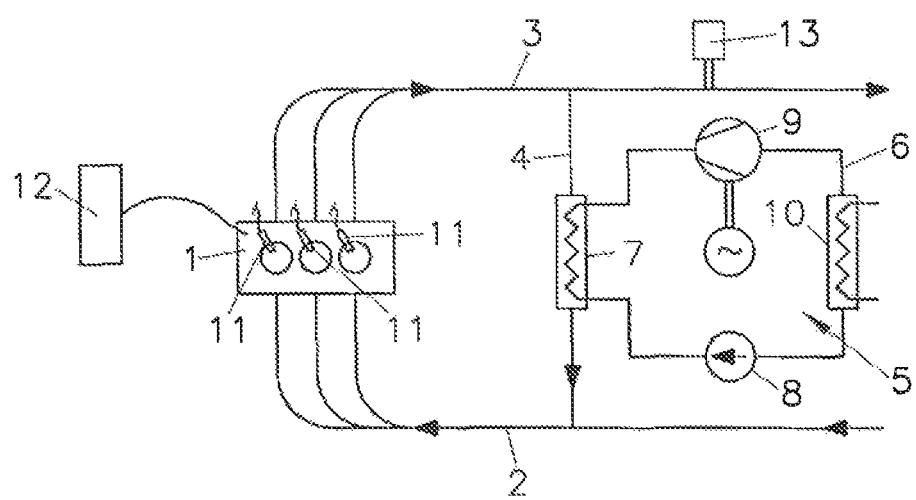

METHOD FOR DETECTING AN UNSEALED LOCATION IN A HEAT RECOVERY SYSTEM OF AN INTERNAL COMBUSTION ENGINE

CROSS-REFERENCE TO RELATED APPLICATIONS

This application is a national stage filing based upon International PCT Application No. PCT/AT2016/050254, filed 19 Aug. 2016, which claims the benefit of priority to Austria application No. A 50744/2015, filed 28 Aug. 2015.

BACKGROUND OF THE INVENTION

The invention relates to a method for detecting a leak in a heat-recovery system of an internal combustion engine of a motor vehicle, wherein the heat-recovery system comprises at least one combustible working medium, a working medium circuit with at least one EGR evaporator, a pump and at least one expansion machine.

When operating a system for heat recovery with a combustible working medium in conjunction with an internal combustion engine and an exhaust gas recirculation evaporator (EGR evaporator: EGR=Exhaust Gas Recirculation), the detection of leaks in the system is of high priority. Leakages in a heat-recovery system can lead, among other things, to the following critical scenarios:
  Discharge of the working medium into the environment—leads to the risk of fire when using a combustible working medium such as ethanol.
  Entry of the combustible working medium into the internal combustion engine, which causes damage when, for example, the working medium passes into the combustion chamber via an EGR evaporator.
  Overheating of system components due to insufficient working medium level, which, for example, can lead to overheating of the exhaust gas evaporator if the mass flow of the working medium is too low.

To detect a leakage in a heat-recovery system, for example, the following methods are known:
  Monitoring of the filling level of the working medium in the expansion tank by means of a level sensor. If the filling level is too low, a leak is assumed.
  Leak test by pressurizing the deactivated cold system and then observing the pressure gradient. A too rapid pressure drop indicates a leak.
  Measuring the electrical conductivity of the insulation of the heat-recovery system. A change in conductivity is a sign of a leak.

U.S. Pat. No. 6,526,358 B1 describes a method for the detection of leaks and blockages in a fluid circuit, wherein pressure, temperature and flow rate at different points of the circuit are measured and correlated.

JP 2010-156314 A discloses a heat-recovery system for an internal combustion engine, wherein $O_2$ sensors are arranged for leakage detection in the coolant circuit of the heat-recovery system.

Known methods have the disadvantage that they can either be performed only in the deactivated state and/or that devices such as additional sensors or the like are required.

BRIEF SUMMARY OF THE INVENTION

It is the object of the invention to be able to detect leakages in the EGR evaporator of a heat-recovery system in an early and reliable manner on the basis of existing sensors and in the simplest possible way.

According to the invention, this takes place in that the internal combustion engine is operated in motor-braking mode, the oxygen concentration in the exhaust gas is determined and is compared with a defined bottom threshold value, and a leakage in the EGR evaporator is recognized when said concentration drops beneath the bottom threshold value.

It is preferably provided that the detection of a leakage in the EGR evaporator is only active when the internal combustion engine is in motor-braking mode.

A particularly low effort in detecting a leak in the EGR evaporator is necessary if the oxygen concentration in the exhaust gas of the internal combustion engine is determined by means of a sensor, preferably a λ sensor or a NOx sensor. λ sensors and/or NOx sensors are used by default for the control of the internal combustion engine to comply with exhaust regulations. These existing λ sensors and/or the NOx sensors can thus also be used in accordance with the teachings of the present invention to detect leaks in the EGR evaporator.

The measurement of the oxygen concentration is appropriately performed upstream of an exhaust gas aftertreatment system to avoid falsification of the measurement result.

Especially when a combustible working medium is used in the heat-recovery system, leaks can be detected in the EGR evaporator with little effort in this way.

Prerequisite for the error-free detection of leaks by means of determining the oxygen concentration is that the internal combustion engine is in a defined operating condition. In particular, the following conditions must be met:
  Motor-braking mode of the internal combustion engine,
  Sensor for measuring the oxygen concentration is active,
  No fuel injection to raise the exhaust gas temperature for example,
  No error in the fuel injection system.

If recognition of leaks is activated, the oxygen concentration is compared with a lower threshold for a defined period of time. If the oxygen concentration is below this threshold value, then it can be assumed that combustible working medium reaches the combustion chambers of the internal combustion engine via a leakage in the EGR evaporator and the oxygen concentration in the exhaust gas is reduced there by thermal conversion (combustion). This reduction of the oxygen concentration in the exhaust gas is measured via a sensor which is already necessary for the operation of the internal combustion engine. If the measured oxygen concentration is below a defined threshold value for more than a specific time, a leakage in the EGR evaporator is detected. In the case of large leakages in the EGR evaporator, the oxygen concentration can also reach zero in extreme cases.

The heat-recovery system can be operated as a closed or open circuit.

The method in accordance with the invention has the advantage, in comparison to the prior art, that no further sensors or devices are necessary.

BRIEF DESCRIPTION OF THE DRAWINGS

The drawing schematically shows an internal combustion engine 1 with an inlet branch 2 and an outlet branch 3, and an exhaust gas recirculation line 4 between the inlet branch 2 and the outlet branch 3. For recovering the exhaust heat, a heat-recovery system 5 is provided with a working medium circuit 6 for a working medium, having at least one EGR evaporator 7, a pump 8 and at least one expansion machine 9. Reference numeral 10 designates a condenser.

Reference numeral 12 denotes the control unit of the internal combustion engine. Possible filters, catalytic converters, control elements and heat exchangers in the inlet branch 2 and outlet branch 3 are not shown.

DETAILED DESCRIPTION OF THE INVENTION

Fuel is injected via injectors 11 into the combustion chambers of the internal combustion engine 1.

In outlet branch 3, a sensor 13, e.g. a λ sensor or a NOx sensor, is arranged, which is already installed by default for regulating the emissions in current conventional motor vehicles. If the detection of the leakages is activated, the oxygen concentration measured in the outlet branch 3 via the sensor 13 is compared with a predefined lower threshold value for a defined period of time.

If the oxygen concentration measured via the sensor 13 lies below this threshold, it is assumed that combustible working medium passes through a leakage in the EGR evaporator into the combustion chambers of the engine and the oxygen concentration in the exhaust gas is reduced there by thermal conversion (combustion). If the measured oxygen concentration is below the defined threshold value for longer than a predefined minimum time, a leakage in the EGR evaporator is detected. In the case of large leakages in the EGR evaporator, the oxygen concentration can also reach zero in extreme cases.

Leakage detection is enabled if the following conditions are met:
  The internal combustion engine 1 is in motor-braking mode,
  The sensor 13 is active,
  There is no fuel injection, for example, to raise the exhaust gas temperature and
  There is no error in the fuel injection system.

With the method described, it is possible to detect leakages in the EGR evaporator 7 of the heat-recovery system 5 with extremely little effort and without additional components or sensors.

The invention claimed is:

1. A method for recognizing a leak in a heat-recovery system of an internal combustion engine of a motor vehicle, wherein the heat-recovery system comprises at least one combustible working medium, a working medium circuit with at least one EGR evaporator, a pump and at least one expansion machine, the method including the following steps:
  operating the internal combustion engine in motor-braking mode;
  determining an oxygen concentration in an exhaust gas of the internal combustion engine;
  comparing the determined oxygen concentration with a defined bottom threshold value; and
  recognizing the leakage in the at least one EGR evaporator in response to the determined oxygen concentration dropping beneath the bottom threshold value.

2. The method according to claim 1, wherein the step of recognizing the leakage in the at least one EGR evaporator is only active when the internal combustion engine is in motor-braking mode.

3. The method according to claim 1, wherein the step of recognizing the leakage in the at least one EGR evaporator is only active when the fuel injection to the internal combustion engine is deactivated.

4. The method according to claim 1, wherein the step of recognizing the leakage in the at least one EGR evaporator is deactivated in response to a fault in the fuel injection system.

5. The method according to claim 1, wherein the step of recognizing the leakage in the at least one EGR evaporator requires the drop in the determined oxygen concentration beneath the bottom threshold value to occur over a defined minimum duration.

6. The method according to claim 1, wherein the determined oxygen concentration in the exhaust gas of the internal combustion engine is determined by means of at least one sensor.

7. The method according to claim 6, wherein the at least one sensor is a λ sensor.

8. The method according to claim 6, wherein the step of recognizing the leakage in the at least one EGR evaporator is only active when the sensor is active.

9. The method according to claim 6, wherein the at least one sensor is arranged upstream of an exhaust-gas aftertreatment system.

10. The method according to claim 6, wherein the at least one sensor is a NOx sensor.

* * * * *